(12) United States Patent
MacKay et al.

(10) Patent No.: US 7,529,863 B2
(45) Date of Patent: May 5, 2009

(54) MULTI-FUNCTION PERIPHERAL FOR INITIATING A WORKFLOW PROCESS AND PROVIDING STATUS FEEDBACK OF THE SAME

(75) Inventors: Andy MacKay, McMahons Point (AU); Daniel Bradbury, Castle Hill (AU); Peter Strohkorb, Beacon Hill (AU)

(73) Assignee: Canon Kabushiki Kaisha, Tokyo (JP)

( * ) Notice: Subject to any disclaimer, the term of this patent is extended or adjusted under 35 U.S.C. 154(b) by 546 days.

(21) Appl. No.: 10/879,112

(22) Filed: Jun. 30, 2004

(65) Prior Publication Data

US 2005/0055475 A1    Mar. 10, 2005

(30) Foreign Application Priority Data

Jul. 2, 2003    (AU) .............................. 2003903369

(51) Int. Cl.
  G06F 3/00    (2006.01)
  G06F 15/177  (2006.01)
(52) U.S. Cl. .............................. 710/15; 710/18; 710/19; 715/736; 715/740
(58) Field of Classification Search ............. 710/15–19; 715/736, 740, 748, 764, 779
See application file for complete search history.

(56) References Cited

U.S. PATENT DOCUMENTS

| | | | |
|---|---|---|---|
| 5,627,764 A | 5/1997 | Schutzman et al. | 364/514 R |
| 5,699,494 A | 12/1997 | Colbert et al. | 395/114 |
| 5,903,733 A * | 5/1999 | Hong | 709/232 |
| 6,026,258 A | 2/2000 | Fresk et al. | |
| 6,119,142 A | 9/2000 | Kosaka | 709/200 |
| 6,226,096 B1 * | 5/2001 | Ouchi | 358/1.14 |
| 6,339,838 B1 | 1/2002 | Weinman, Jr. | 717/1 |
| 6,462,756 B1 * | 10/2002 | Hansen et al. | 715/764 |
| 6,469,796 B1 * | 10/2002 | Leiman et al. | 358/1.15 |
| 6,633,871 B1 * | 10/2003 | Jeyachandran et al. | 707/9 |
| 6,762,853 B1 * | 7/2004 | Takagi et al. | 358/1.15 |
| 6,856,416 B1 * | 2/2005 | Danknick | 358/1.15 |
| 6,937,354 B2 * | 8/2005 | Kobayashi et al. | 358/1.13 |
| 2003/0011633 A1 | 1/2003 | Conley et al. | 345/762 |
| 2003/0043416 A1 | 3/2003 | Rublee et al. | |
| 2003/0048303 A1 * | 3/2003 | Mesa et al. | 345/771 |
| 2004/0039721 A1 * | 2/2004 | Tsuchiya | 707/1 |
| 2004/0064762 A1 * | 4/2004 | Deshpande et al. | 714/44 |

FOREIGN PATENT DOCUMENTS

| | | |
|---|---|---|
| EP | 0 895 390 A2 | 2/1999 |
| JP | 2002-252732 A | 9/2002 |
| JP | 2002-329011 A | 11/2002 |
| JP | 2003-030348 A | 1/2003 |

OTHER PUBLICATIONS

Scansoft OmniPage SE User's Guide, Copyright 2002.*
Examiner's Report dated Nov. 28, 2006, issued in counterpart Australian application.

* cited by examiner

*Primary Examiner*—Alan Chen
(74) *Attorney, Agent, or Firm*—Fitzpatrick, Cella, Harper & Scinto

(57) ABSTRACT

A multi-function peripheral (100) forming part of a system (200) for automating and managing business processes is disclosed. The multi-function peripheral (100) has an input device (117) for initiating a workflow process in the system (200). The multi-function peripheral (100) also receives status notification from the system (200) during the workflow process, and provides status feedback to a user. The user may be required to make further selections in response to the status feedback.

18 Claims, 5 Drawing Sheets

MULTI-FUNCTION PERIPHERAL FOR INITIATING A WORKFLOW PROCESS AND PROVIDING STATUS FEEDBACK OF THE SAME

This application claims priority from Australian Provisional Patent Application No. 2003903369 filed on Jul. 2, 2003, which is incorporated herein by reference.

FIELD OF THE INVENTION

The present invention relates generally to a multi-function peripheral linked to a workflow routing system and, in particular, to initiating a workflow process within the workflow routing system from the multi-function peripheral, and providing status feedback of the workflow process on the multi-function peripheral.

BACKGROUND

Systems exist whereby a hardcopy document may be scanned into a computer network and distributed to one or more predefined destinations. Such destinations may include an electronic mail address, a document management system and a file folder within the network.

However, many existing systems do not provide any feedback to the device used for scanning the hardcopy document into the network. In existing systems that do provide feedback, the feedback is typically limited to confirming that the scanned document has arrived at its destination.

Workflow routing systems exist which allow for specifying a list of processes to be performed, the order in which the processes are to be performed, as well as the expected output of each of the processes. Such workflow routing systems may be linked to a scanning device for inputting hardcopy documents into the system in order for one or more of the processes to be performed on the documents. A server that controls the workflow routing system may send status notifications to one or more predefined destinations. However, notifications are not sent to the scanning device. Further, the processes to be performed are typically selected from the server or computer linked to the server before or after the document has been scanned.

SUMMARY

A need exists for a multi-function peripheral, such as a photocopy machine, to be linked to a workflow routing system, and where status notifications of a selected process are provided by the multi-function peripheral.

Another need exists for a multi-function peripheral to be linked to a workflow routing system, where a process to be performed in the workflow routing system is selected on the multi-function peripheral.

According to a first aspect of the present disclosure, there is provided a multi-function peripheral comprising:

a communications arrangement for linking said multi-function peripheral to a computer system configured to perform at least one workflow process;

an input device for initiating said workflow process in said computer system; and an output device for providing status feedback to a user, wherein said multi-function peripheral is configured to receive one or more status notifications from said computer system, said notifications being associated with one or more processes of said workflow process, and for providing status feedback in response to said one or more status notifications.

According to a second aspect of the present disclosure, there is provided a workflow routing system comprising:

a computer system configured to perform at least one workflow process; and a multi-function peripheral linked to said computer system for initiating at least one of said workflow processes, for receiving one or more status notifications from said computer system, said notifications being associated with one or more processes of the initiated workflow process, and for providing status feedback to a user in response to said one or more status notifications.

According to another aspect of the present disclosure, there is provided a workflow routing method comprising the steps of:

receiving initialization of at least one workflow process from a multi-function peripheral;

invoking one or more processes of the workflow process on one or more process computers; and providing one or more status notifications to the multi-function peripheral, the status notifications being associated with the invoked processes of the initiated workflow process.

According to another aspect of the present disclosure, there is provided a multi-function peripheral comprising:

an input device for receiving a selection of a workflow process from a list of workflow processes; and a communications arrangement for linking said multi-function peripheral to a computer system and for communicating the selected workflow process to said computer system, said computer system being configured to perform said selected workflow process.

According to another aspect of the present disclosure there is provided a workflow routing system comprising:

a multi-function peripheral for receiving a selection of a workflow process from a list of workflow processes, and a computer system linked to said multi-function peripheral, said computer system being configured to perform the selected workflow process.

Other aspects of the invention are also disclosed.

BRIEF DESCRIPTION OF THE DRAWINGS

One or more embodiments of the present invention will now be described with reference to the drawings, in which.

DETAILED DESCRIPTION

Figure 1:
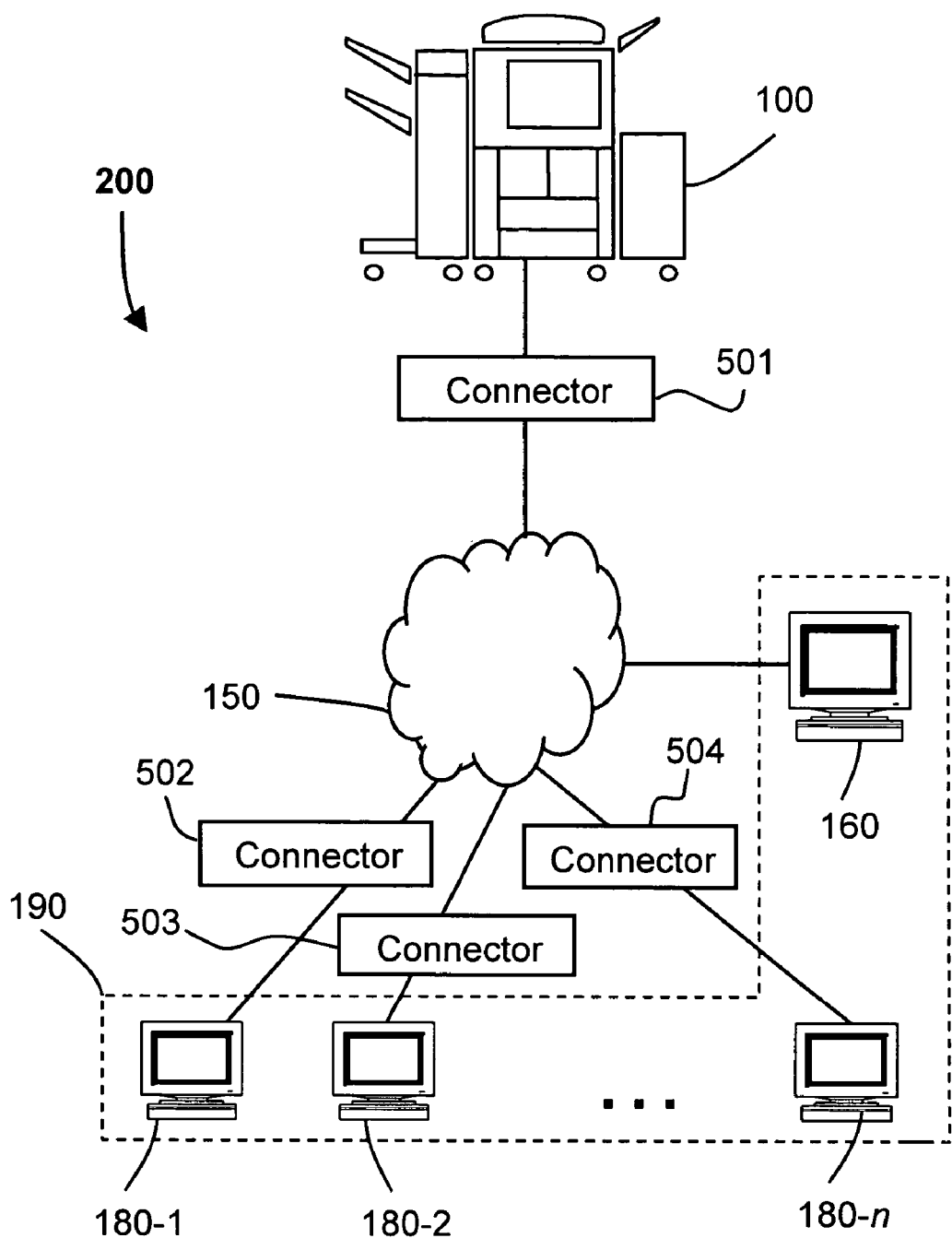
FIG. 1 shows a schematic block diagram of a system for automating and managing business processes.

It is to be noted that the discussions contained in the "Background" section relating to prior art systems relate to systems which form prior art through their respective publication and/or use. Such should not be interpreted as a representation by the present inventors or patent applicant that such systems in any way form part of the common general knowledge in the art.

Where reference is made in any one or more of the accompanying drawings to steps and/or features, which have the same reference numerals, those steps and/or features have for the purposes of this description the same function(s) or operation(s), unless the contrary intention appears.

FIG. 1 shows a schematic block diagram of a system 200 for automating and managing business processes. The system 200 uses a client/server architecture, where clients, which include a multi-function peripheral (MFP) 100 and a number of process computers 180-1 to 180-n, make requests to a business process server 160. The business process server 160 processes these requests, and sends responses back to the clients 100 and process computers 180-1 to 180-n. The business process server 160, the clients 100 and process computers 180-1 to 180-n are interconnected through a network 150, such as a Local Area Network (LAN) or a Wide Area Network (WAN). Jointly the business process server 160 and process computers 180-1 to 180-n form a workflow routing system 190.

Figure 2:
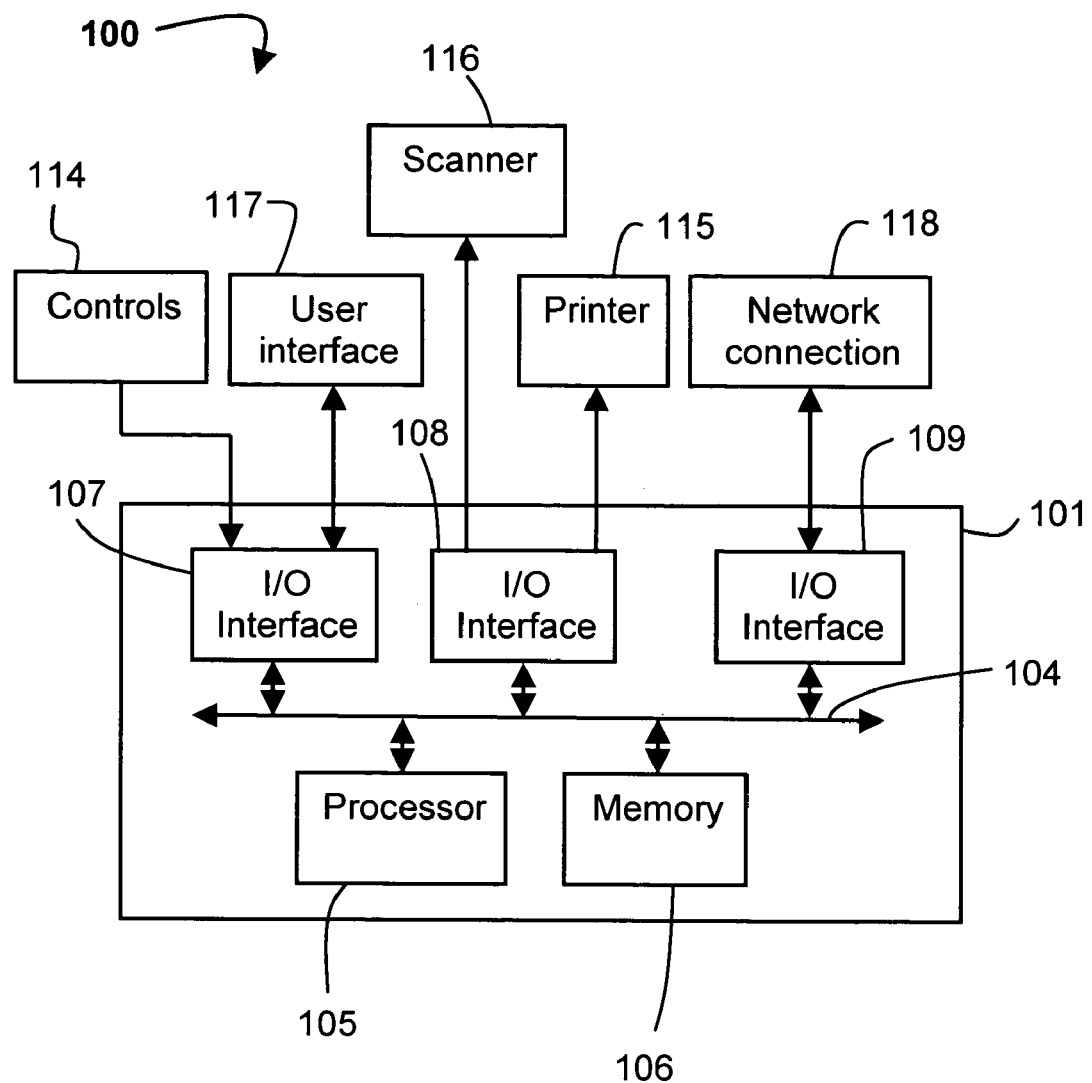
FIG. 2 shows a schematic block diagram of an exemplary multi-function peripheral.

FIG. 2 shows a schematic block diagram of the MFP 100. The MFP 100 is formed by a computer module 101, a printer 115 for providing printed paper as output, a scanner 116 for receiving paper as input, and digitising any images formed on the paper into an electronic format, a user interface 117, controls 114, and a network connection 118. The user interface 117 typically includes a display for displaying information to a user in textual or graphical form, and a touch screen for receiving commands from the user. The network connection 118 is used by the computer module 101 for communicating to and from the network 150.

The computer module 101 typically includes at least one processor unit 105, and a memory unit 106, for example formed from semiconductor random access memory (RAM) and read only memory (ROM). The module 101 also includes a number of input/output (I/O) interfaces including an I/O interface 107 for the user interface 117 and controls 114, an I/O interface 108 for the printer 115 and scanner 116, and an interface 109 for the network connection 118. The components 105 to 109 of the computer module 101 typically communicate via an interconnected bus 104 and in a manner which results in a conventional mode of operation of the computer system 100 known to those in the relevant art.

An application program executing within the processor 105 of the MFP 100 manages the interaction with the scanner 116 and the printer 115, the user interface 117 and the communications to the business process server 160 via the network connection 118.

Referring again to FIG. 1, each of the business process server 160 and process computers 180-1 to 180-n comprise a processor, memory, a storage device such as a hard disk drive, and a network connection for connecting to the network 150, as are known in the art.

An application program executing within the processor of the business process server 160 provides a number of components. The components include a MFP request processor, which is a multi-threaded socket-based server component, that accepts requests from the MFP 100, converts the request from the MFP 100 into a client-independent request object, and then passes this request to a generic request processor for further processing.

The generic request processor is responsible for processing client requests, and is independent of any particular client type. The request processor also interacts with a workflow engine, if required. The workflow engine invokes other applications, produces MFP and electronic mail notifications, and stores data. The workflow engine is also responsible for controlling the 'flow' of information between the server 160 and clients 100 and process computers 180-1 to 180-n as a business process progresses through its lifecycle. Business processes are explained in more detail below.

The workflow engine is a state-based engine, in which an instance of a business process moves between states as transitions are executed. Every state defines a set of entry events, which are executed as soon as that state is entered, and exit events, which are executed just prior to leaving that state. For instance, an event may invoke an external process, or send an electronic mail to an address within the network 150.

The application program executing within the processor of the business process server 160 further includes connectors which provide mechanisms for communicating from the business processes server 160 to applications executing within the process computers 180-1 to 180-n. The connectors referred to above become virtual links in the system 200 and are conceptually shown in FIG. 1 as connectors 501-504. In this regard, the connectors 501-504 are software interconnections, that operate (as compared to the manner in which they are illustrated in FIG. 1) upon the business process server 160, but which effectively form connections (as illustrated in FIG. 1) between the business process server 160, the MFP 100 (via the connector 501) and the clients 180-1 to 180-n (the connectors 502-504). The connectors enable appropriate interface between the supported applications.

Figure 3:
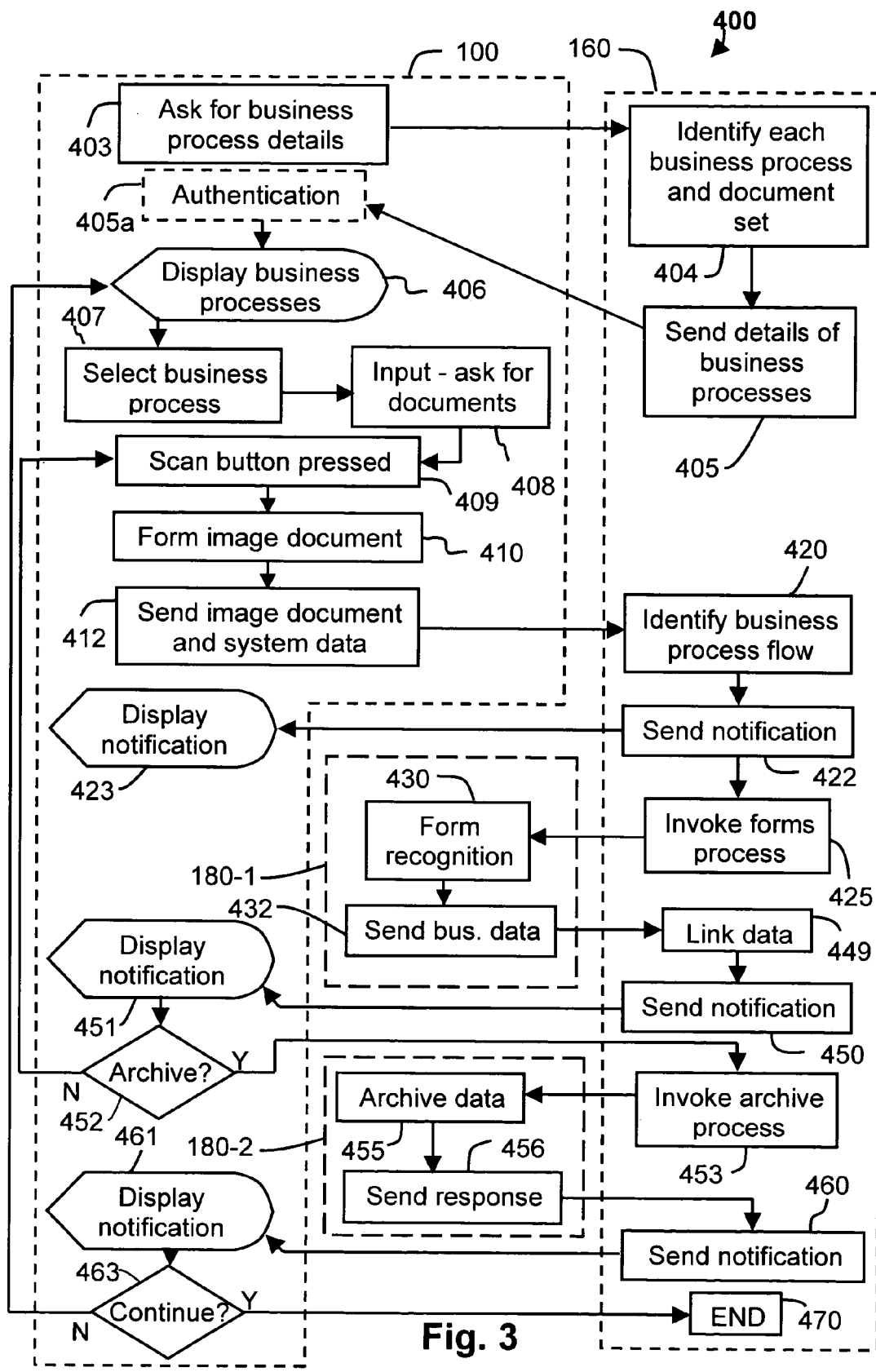
FIG. 3 shows flow diagram of an example process for automating and managing business processes performed by the system of FIG. 1.

FIG. 3 shows a flow diagram of an example process 400 for automating and managing business processes performed by the system 200 (FIG. 1). Steps within the process 400 are implemented as software executing within the MFP 100, the business process server 160 and process computers 180-1 to 180-n.

The example process 400 starts at step 403 where the processor 105 of the MFP 100 forms a request for business process details. The request is sent via the network 150 to the business process server 160. The business process server 160 then in step 404 receives the request for business process details and operates to formulate a response containing the list of available business processes together with details required for the performance of each business process. In step 405, the business process server 160 sends the list to the MFP 100, via the network 150. In an optional step 405a, on receipt of the list from the business process server 160, the processor 105 of the MFP 100 authenticates the user by means of, for example, a password login, a smart card, or biometric details such as a fingerprint.

Step 406 follows where the MFP 100 displays a listing of business processes available for selection on the user interface 117. If the authentication step 405a has been carried out, only a subset of the list, namely those processes available to the particular user, is displayed.

Figure 4A:
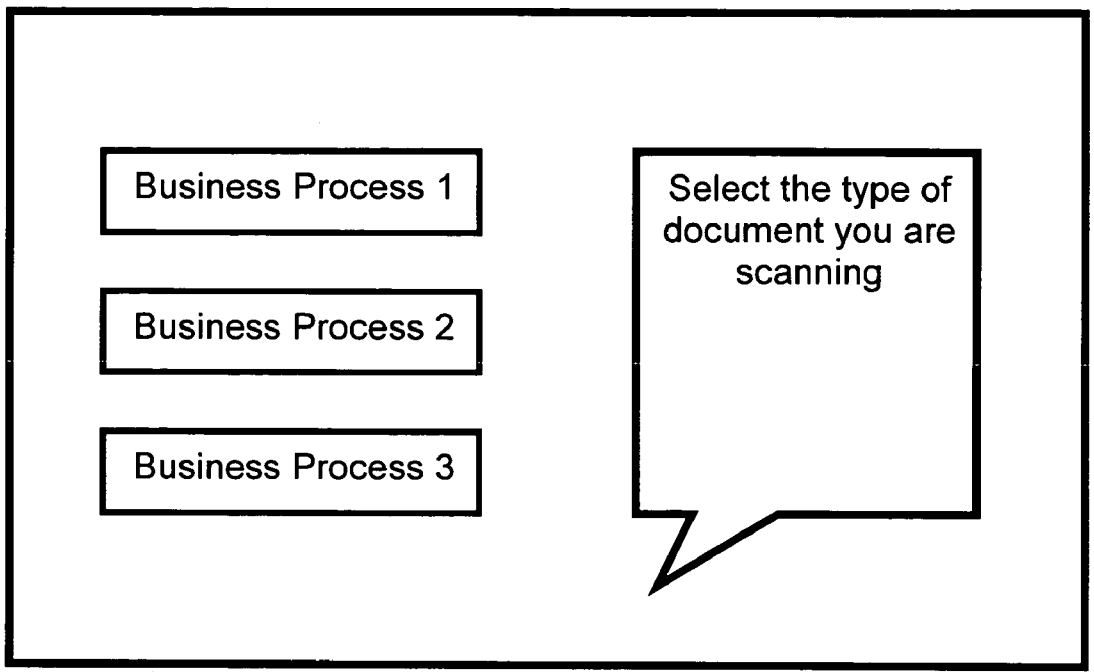
FIGS. 4A and 4B show example screens displayed on a user interface of the multi-function peripheral.

FIG. 4A shows an example of such a default screen where a listing of three business processes for selection is displayed. In step 407, the user selects a business process from the list by means of the controls 114. Step 408 follows where the MFP 100 initiates the selected business process by prompting the user via the user interface 117 to place the appropriate document on the scanner 116.

Figure 4B:
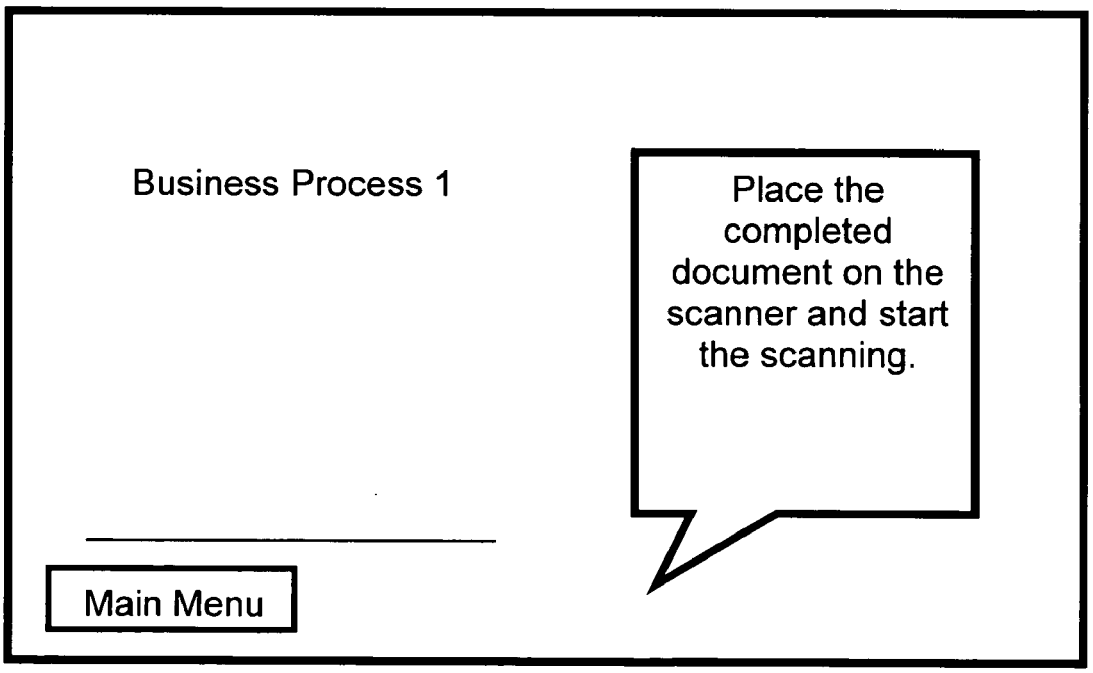

FIG. 4B shows an example of the display on the user interface 117 in response to user selection of business process 1. The user is also provided with an option to return to the "main menu", in which case the example process 400 ends.

When the processor 105 of the MFP 100 detects, in step 409, that the "scan button" has been pressed, the MFP 100 scans the document(s), using the scanner 116, to form in step 410 an electronic image document, which is placed in memory 106. Preferably the image document is in the TIFF image format. While the document is being scanned, the processor 105 controls the user interface 117 to display a "scanning" status message to the user.

The MFP 100 then, in step 412, sends system data, including the business process selection, and the image document to the business process server 160, and displays a "sending document" status message on the user interface 117.

Upon receipt of the system data and the image document by the business process server 160 in step 420, the business process selection is used by the processor of the business process server 160 to identify a business process flow that is associated with the business process selection. Typically a look-up table is used to relate each business process with a business process flow.

The business process flows are typically configured by a business analyst/application developer. Each business process flow specifies a list of processes to be performed to achieve a business goal, the order in which the processes have to be performed, as well as the expected output of each process to the business process server 160. The output may be an acknowledgment that the process has been completed, confirmation that the completed process was successful, or data produced by the process. Each business process flow also specifies what notifications are to be sent to the MFP 100 for display to the user.

For example, if the process flow requires for data to be sent to a first external process operating in the process computer 180-1, and the result of the first external process to be sent to a second external process operating in the client 180-2, then the business process server 160 would send the data to the first external process, and wait until reply data is received from the first external process before the second external process is invoked using the reply data. Similarly, should a third external process operated by the process computer 180-3 follow the second external process but, say, also use the reply data from the first external process, then the business process server 160 would send the data to the second external process, and wait for an acknowledgment from the second external process before the third external process is invoked using the reply data from the first external process. The business process flow is thus completely configurable, as is known in the art.

The business process server 160 also keeps an audit trail of all instances where processes are invoked and responses received.

During the business process flow, and in particular upon receipt of an output from a process, the business process server 160 may send notifications to the MFP 100 if the business process flow so dictates. Upon receipt of such notifications from the business process server 160 by the MFP 100, the MFP 100 provides feedback to the user in the form of a message displayed on the user interface 117, and/or by printing a status form using the printer 115. The business process server 160 may also send electronic mail messages to computers linked to the network 150 to inform one or more parties of completed processes.

Referring again to the example process 400, in step 422 the business process server 160 sends a notification to the MFP 100 via network 150. The MFP 100 then in step 423 displays the notification in the form of a message on the user interface 117, and/or prints the notification on the printer 115. The message typically informs the user that the documents have been received and that the selected process has started.

The business process server 160 also invokes processes 1, 2, ... m running on one or more of the process computers 180-1 to 180-n according to the business process flow identified in step 420.

Let the example process 400 be an implementation in a bank environment, where a MFP 100 is provided in the client area. A client (user) would fill in a form and select a business process on the MFP 100. Let the chosen business process be "Loan Application", in which case the user was prompted in step 408 to scan a completed loan application form, and drivers licence. In the example process 400, two processes are invoked. A first is a forms process for performing forms recognition on the image document, and the second is a document management process which archives data extracted by the forms process.

Therefore, the example process 400 continues in step 425 where the business process server 160 invokes the forms process running on process computers 180-1 by sending a request which includes the image document to process computer 180-1. Upon receipt of the image document by the process computer 180-1, the process computer 180-1 performs in step 430 form recognition on the image document to extract (using automatic character recognition (OCR)) data, termed business data. The form recognition and the OCR can be conducted either concurrently or in sequence. Optionally, a user of the process computer 180-1 compares the scanned image and the business data extracted by the OCR on a display monitor to verify the business data. The business data may be alphanumeric, graphical, or combinations thereof, such as 'Name', 'Account number', and 'Signature'. The process computer 180-1 responds to the request by returning to the business process server 160 in step 432 the business data.

Upon receipt of the business data by the business process server 160, the business data is linked in step 449 with the system data and the image document by the business process server 160. The business process server 160 also sends a notification to the MFP 100 via network 150 in step 450, upon which the MFP 100, in step 451, displays the notification in the form of a message on the user interface 117, and/or prints the notification on the printer 115. The message typically informs the user that process 1 of 2 of the selected process has been completed successfully.

Figure 5:
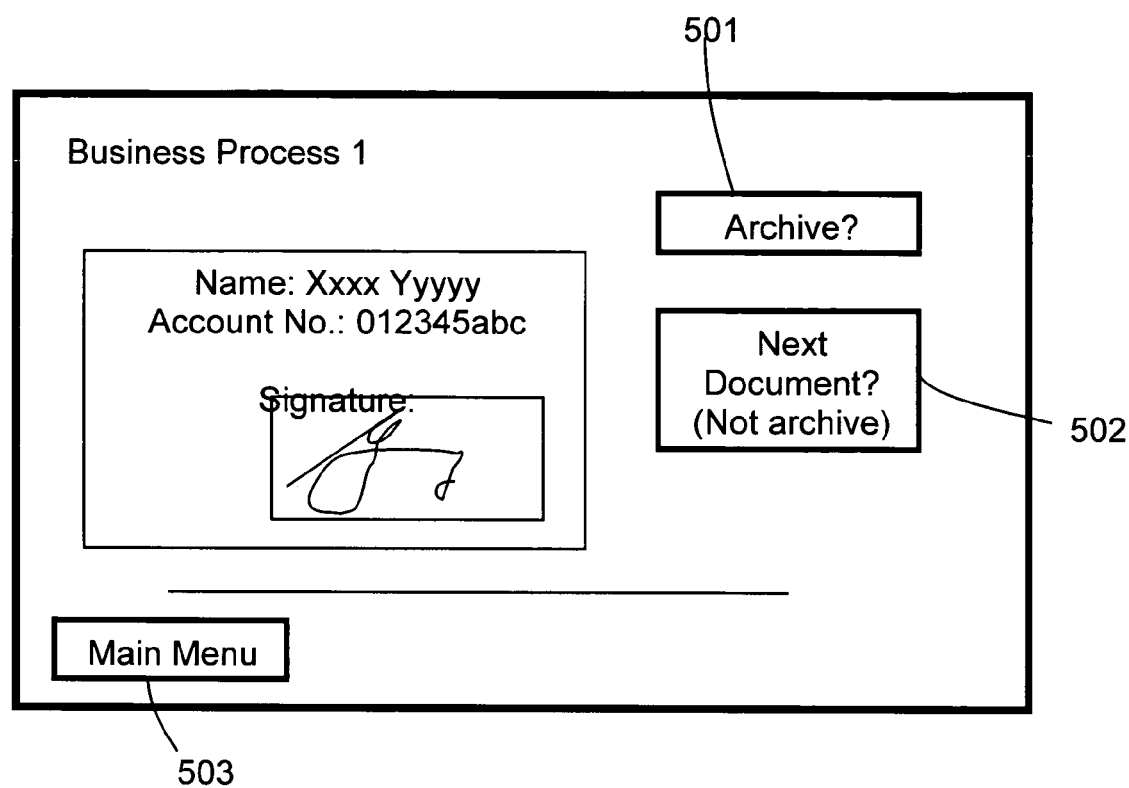
FIG. 5 shows an example of a user interface.

The notification additionally prompts the user to select a next action. FIG. 5 shows an example screen where the user is be provided with results from the form recognition process 430 for the user to confirm correct recognition of name and account number details. The user is further prompted to select whether he/she wish to proceed the current process flow by archiving the information by pressing button 501, to return to a previous step, in this case step 409, to scan a next document by pressing button 502, or to exit the current business process by pressing button 503 and return to step 406 where the user will be promted to select a business process. Accordingly, in step 452 the MFD 100 receives an input from the user whether to archive the current information or not. The input is provided by selection of an option on the user interface 117. In the case where the user does not wish to archive at this stage, process 400 returns to step 409.

Alternatively, if the user elected to archive the current information, and in the example process 400 where the next process is the document management process, the business process server 160 invokes in step 453 the document management process by sending the required data (system data, image document, and business data) to process computer 180-2.

Upon receipt of the data by the process computers 180-2, the process computer 180-2 archives in step 455 the data, and responds to the business process server 160 in step 456. The response acknowledges successful archiving of the data.

In the example process 400 where only two processes are invoked by the business process server 160, upon receipt of the response from the process computer 180-2 by the business process server 160, the business process computer 160 sends in step 460 a notification to the MFP 100 that the selected business process has been successfully completed. The MFP 100 then, in step 461, displays a message on the user interface 117, and/or prints a status form using the printer 115 to inform the user that the process is complete. The user is also provided with a selection of next actions. The selection may include returning to the business process menu, or for the process to end. In the case where the user selects to return to the business process menu, or after a selectable period (eg: 10 seconds), the processor 105 of the MFP 100 returns to step 406 where the user interface 117 is controlled by the processor 105 to again display the listing of the business processes available for selection. Alternatively process 400 ends in step 470.

As is evident from the above description, through the user interface 117 of the MFP 100 the user is able to initiate a workflow process in the workflow routing system 190, be provided with status feedback from the workflow process, and direct the flow of the workflow process, typically subject to the status feedback.

The foregoing describes only some embodiments of the present invention, and modifications and/or changes can be made thereto without departing from the scope and spirit of the invention, the embodiments being illustrative and not restrictive.

We claim:

1. A workflow routing system, comprising:
   a computer system configured to perform a plurality of workflow processes, each workflow process including a series of events to be executed using at least one external processing computer; and
   a multi-function peripheral linked to the computer system, the multi-function peripheral being configured for scanning a document to form an electronic image document, for receiving a user initiation of at least one of the workflow processes, for communicating the initiation of the at least one of the workflow processes to the computer system, and for receiving one or more status notifications from the computer system, the status notifications being associated with one or more events of the one or more initiated workflow processes, at least one of the one or more events resulting in extraction of data from the electronic image document, said multi-function peripheral being further configured for displaying on an output device a status feedback, including the extracted data, associated with one or more events executed by the at least one external processing computer to a user based upon the one or more received status notifications,
   wherein the computer system includes:
      one or more processing computers, each for performing one or more events of the one or more initiated workflow processes; and
      a server for receiving the initiation, for invoking the one or more events on the one or more processing computers, and for providing the one or more status notifications to the multi-function peripheral.

2. The workflow routing system as claimed in claim 1, wherein the multi-function peripheral is further configured to receive a selection from the user, the selection influencing a flow of at least one of the plurality of workflow processes.

3. A workflow routing system as claimed in claim 1, wherein the output device includes one or more of:
   a printer for printing a document containing the status feedback; and
   a display for displaying the status feedback.

4. A workflow routing system as claimed in claim 1, wherein the multi-function peripheral provides the electronic image document as input to the one or more initiated workflow processes, and wherein the one or more initiated workflow processes include character recognition for extracting the data from the electronic image document.

5. A workflow routing system as claimed in claim 1, wherein the multi-function peripheral is adapted to receive a selection of a workflow process from a list of workflow processes.

6. A workflow routing method of a computer system, comprising steps of:
   receiving a user initiation of a workflow process, selected from a plurality of workflow processes, from a multi-function peripheral, each workflow process including a series of events to be executed;
   obtaining an electronic image document representing a scanned document;
   invoking one or more events of the workflow process on one or more external processing computers of the computer system, at least one of the one or more events resulting in extraction of data from the electronic image document;
   displaying one or more status notifications, including the extracted data, to the multi-function peripheral, the displayed one or more status notifications being associated with one or more of the one or more events of the initiated workflow process invoked by the one or more of the external processing computers;
   receiving an initiation, for invoking the one or more events on the one or more processing computers; and
   providing the one or more status notifications to the multi function peripheral.

7. The workflow routing method as claimed in claim 6, further comprising a step of receiving a selection from the multi-function peripheral, the selection influencing one or more of the one or more events of the workflow process.

8. The workflow routing method as claimed in claim 6, further comprising a step of receiving the electronic image document from the multi-function peripheral, wherein the workflow process includes character recognition for extracting the data from the electronic image document.

9. The workflow routing method as claimed in claim 6, further comprising a step of sending a list of workflow processes to the multi-function peripheral, wherein a selection of one of the workflow processes in the list is received in the receiving step.

10. A workflow routing system, comprising:
    a multi-function peripheral for scanning a document to form an electronic image document and for receiving a selection from a user of a workflow process from a list of workflow processes, each workflow process including a series of events to be executed; and
    a computer system linked to the multi-function peripheral, the computer system being configured to execute a series of events of the selected workflow process using at least one external processing computer, at least one of the series of events resulting in extraction of data from the electronic image document, wherein the multi-function peripheral is adapted to receive one or more status notifications from the computer system, the status notifications being associated with one or more events of the selected workflow process, and to display on an associated display device a status feedback, including the extracted data, associated with one or more of the series of events executed by the at least one external processing computer to a user based upon the one or more received status notifications, wherein the computer system includes:

one or more processing computers, each for executing one or more events of the selected workflow process; and a server for receiving the selection, for invoking events on the one or more process computers, and for providing the status notifications to the multi-function peripheral.

11. The workflow routing system as claimed in claim 10, wherein the multi-function peripheral is configured to receive an event selection from the user, the event selection influencing a flow of at least one of the workflow processes.

12. A workflow routing system as claimed in claim 10, wherein the display device includes a printer for printing a document containing the status feedback.

13. A workflow routing system as claimed in claim 10, wherein the multi-function peripheral includes at least a scanner for scanning a hardcopy of the document to form the electronic image document and for providing the electronic image document as input to the selected workflow process, and wherein the selected workflow process includes character recognition for extracting the data from the electronic image document.

14. A multi-function peripheral as claimed in claim 1, wherein the plurality of workflow processes is downloaded to the multi-function peripheral from the computer system.

15. A multi-function peripheral according to claim 1, wherein the extracted data from the electronic image document included in the status feedback is generated based on form recognition.

16. A multi-function peripheral according to claim 1, further comprising a printer, wherein at least one of the received one or more status notifications is printed.

17. A multi-function peripheral according to claim 1, wherein the output device prompts the user to select whether the workflow process is proceeded.

18. A multi-function peripheral according to claim 17, wherein a proceeded workflow process archives the extracted data from the electronic image document.

* * * * *